United States Patent [19]
Bailleul et al.

[11] Patent Number: 5,951,898
[45] Date of Patent: Sep. 14, 1999

[54] ELECTRIC COOKING APPARATUS

[75] Inventors: Philippe Louis Robert Bailleul, St Germain la Blanche Herbe; Jacques Jean, Cormelles le Royal, both of France

[73] Assignee: Moulinex S.A., Paris, France

[21] Appl. No.: 09/045,836

[22] Filed: Mar. 23, 1998

[30] Foreign Application Priority Data

Mar. 21, 1997 [FR] France ................................. 97/03500

[51] Int. Cl.⁶ ........................................... H05B 3/68
[52] U.S. Cl. ............................. 219/450.1; 219/446.1
[58] Field of Search ............................ 219/448, 449, 219/463, 464, 458, 509, 510; 126/393, 90 A, 92 AC, 92 A, 92 B

[56] References Cited

U.S. PATENT DOCUMENTS

| | | | |
|---|---|---|---|
| 3,624,352 | 11/1971 | Deaton | 219/449 |
| 4,414,465 | 11/1983 | Newton et al. | 219/449 |
| 4,447,711 | 5/1984 | Fisher | 219/449 |
| 4,810,857 | 3/1989 | Goessler | 219/464 |
| 5,243,172 | 9/1993 | Hazan et al. | 219/448 |

*Primary Examiner*—Teresa Walberg
*Assistant Examiner*—Sam Paik
*Attorney, Agent, or Firm*—Young & Thompson

[57] ABSTRACT

An electric cooking apparatus comprises a base (1) in the form of a frame defining a hollow internal region (6), a vessel (2) adapted to rest on the base in that internal region, an electric heating resistance (3) disposed above the vessel, a cooking grill (4) disposed above the resistance (3) and adapted to receive food to be grilled, and a thermal regulator (10) mounted in series with the electric heating resistance (3) and operating in a predetermined switching temperature range. A thermostatic safety switch (11) is disposed in the base and mounted in series with the heating resistance (3) and operates at a fixed switching temperature below the minimum temperature of that range and permits detecting, by thermal conduction, abnormal increases of the temperature of the vessel (2) and cuts off as needed the electrical supply of the electric heating resistance (3).

6 Claims, 1 Drawing Sheet

ELECTRIC COOKING APPARATUS

CROSS REFERENCE TO RELATED APPLICATION

This application corresponds to French application 97/03500 of Mar. 21, 1997, the disclosure of which is incorporated herein by reference.

FIELD OF THE INVENTION

The invention relates to an electric cooking apparatus comprising a base in the form of a frame defining an internal hollow region, a vessel adapted to rest on said base in said internal region, an electric heating resistance disposed above the vessel, a cooking grill disposed above the resistance and adapted to receive foodstuffs to be grilled and thermal regulation means mounted in series with the heating resistance and operating in a predetermined range of switching temperatures.

BACKGROUND OF THE INVENTION

An electric cooking apparatus of the preceding type, the manufacturer is confronted with two principal problems, namely: the limitation of the heating of the base, of the components and of the reception surface for the apparatus as well as preventing on the one hand the formation of substantial fumes occasioned by recovery of greases which flow into the vessel and, on the other hand, the creation of large flames in the vessel due to ignition of the greases and which could give rise to risk of fire and emission of undesirable odors. These two problems can be resolved by requiring the user to put some water in the vessel but this operation is a nuisance and is unfortunately not always followed.

SUMMARY OF THE INVENTION

The present invention has for its object to overcome the foregoing drawbacks. It particularly permits obtaining a reliable cooking apparatus, which is not costly and has all the safety conditions for cooking foodstuffs within a house.

According to the invention, the electric cooking apparatus comprises moreover a thermostatic safety switch arranged in the base and mounted in series with the heating resistance, operating at a fixed switching temperature below the minimum temperature of said range and permitting detecting, by thermal conduction, abnormal increases in temperature of the vessel and to cut off, as the case may be, the electrical supply of the electric heating resistance.

Thus, any abnormal elevation of temperature of the vessel is detected by the thermostatic safety switch which permits, thanks to rapid thermal conduction, preventing any injury to the cooking apparatus beyond a predetermined temperature but also external elements disposed adjacent the apparatus particularly adjacent the working surface on which the apparatus rests.

BRIEF DESCRIPTION OF THE DRAWINGS

The characteristics and advantages of the invention will become further apparent from the description which follows, given by way of non-limiting example, with reference to the accompanying drawing, in which.

DETAILED DESCRIPTION OF THE INVENTION

Figure 1:
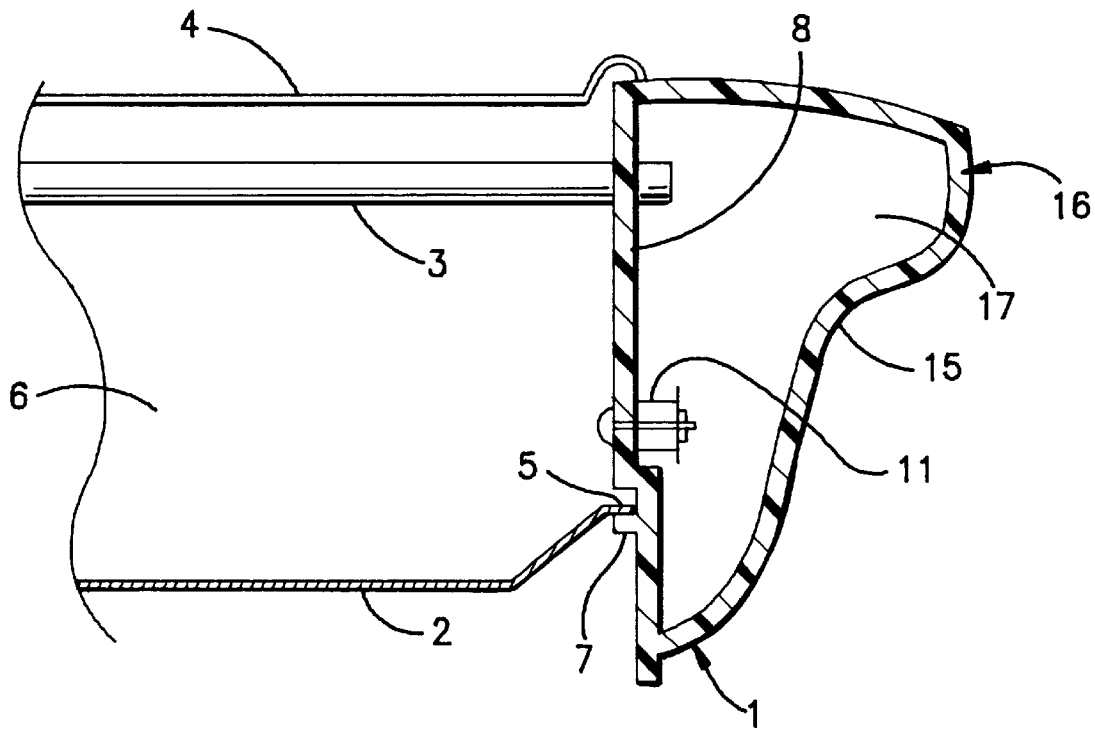
FIG. 1 is a fragmentary schematic view in vertical cross section of a cooking apparatus according to the invention, provided with a thermostatic safety switch.

According to FIG. 1, the electric cooking apparatus comprises a base 1 in the form of a frame of heat resistant material, for example of thermoplastic, defining an internal hollow region 6, a vessel 2 adapted to rest on said base 1 in said internal region 6 and made of metal, for example stainless steel, an electric heating resistance 3 disposed above the vessel and a cooking grill 4 disposed over the resistance 3 and adapted to receive foodstuffs to be cooked. The vessel 2 is adapted to contain water so as to avoid on the one hand too great a temperature rise of the surface on which the apparatus rests and, on the other hand, smoke and flames arising from recovery of cooking greases which flow into said vessel.

The vessel 2 comprises on opposite sides of its length two horizontal edges of which only one, 5, is represented and resting respectively on two horizontal shoulders of which only one, 7, is shown, provided on two lateral opposite edges of the base 1 of which only one, 15, is shown. Preferably, the vessel is removably mounted like a drawer whose shoulders 17 serve as slides. The base 1 comprises, on the two lateral opposite edges 15, two handles of which only one, 16, is shown, each formed by a hollow body 17.

Figure 2:
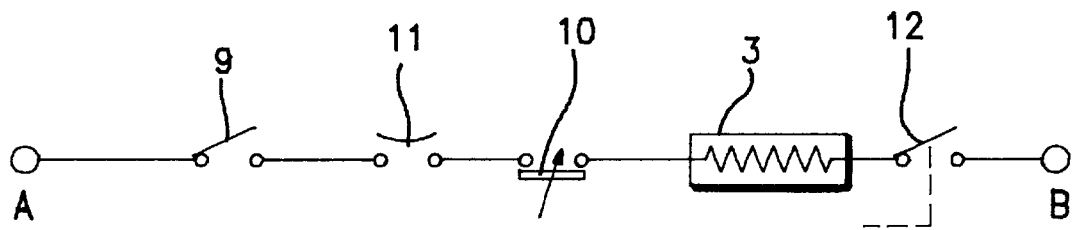
FIG. 2 is an electrical diagram of certain constituent elements of the electrical cooking apparatus according to the invention.

As is seen in FIG. 2, the electric heating resistance 3 is connected in series with an overall switch 9 actuated by the user and thermal regulation means 10 between the terminals A and B of an electric supply source such as for example the 230 Volt mains. The thermal regulation means 10 comprise for example a thermostatic switch adjustable within a predetermined range of switching temperatures so as to permit the user to select a particular temperature corresponding to a grilling temperature for the foodstuff in question. The electric heating resistance 3 is an electric resistance of 2000 W to permit obtaining very powerful grilling.

According to the invention, the cooking apparatus comprises moreover a thermostatic safety switch 11 arranged in the base and mounted in series with the heating resistance 3, operating at a fixed switching temperature below the minimum temperature of said range and permitting detecting, by thermal conduction through the base 1, abnormal temperature increases of the vessel 2 and to cut off, as the case may be, the electrical supply of the electric heating resistance 3.

The thermostatic safety switch 11 has a range of switching temperatures varying substantially from 100° C. to 120° C. and is arranged outside the internal hollow region 6 on the external surface 8 of the base 1. The thermostatic safety switch is of the bilaminar type, disposed on the base 1 adjacent one of the edges 5 of the vessel 2 to create a weak thermal path between the vessel 2 and said thermostatic safety switch 11 and to permit rapid stopping of the electrical supply of the electric heating resistance 3. In a preferred embodiment, the thermostatic safety switch 11 is disposed within one of the handles 16 of the base 1 to avoid direct radiation from the electric heating resistance 3 onto said thermostatic safety switch 11.

This arrangement thus permits minimizing the reaction time of the thermostatic safety switch relative to the other known devices whilst maintaining on the one hand the space limitations and on the other hand while observing the standards of operation of such an apparatus, particularly the standards concerning heating of the base (the regions for gripping the base must not exceed 60° C.), of the components, particularly the electrical supply cable (the temperature of the cable should not exceed 50° C.) connected to the electrical supply source as well as the temperature of the working surface on which said apparatus rests.

Thus, to start the electric cooking apparatus, the user selects a grilling temperature by manipulating the adjustable thermostatic switch 10 and powers the apparatus by closing the overall switch 9. The thermostatic safety switch 11 being in closed position, the electric heating resistance 3 can begin heating.

If the vessel 2 contains a sufficient quantity of water, the grilling temperature will progressively increase to the temperature selected by the user. The switch plays its role as temperature regulator by passing alternately from an open position to a closed position and the thermostatic safety switch remains out of operation.

If the vessel 2 does not contain water or contains an insufficient quantity of water, the temperature of the vessel 2 rises very rapidly and is transmitted by thermal conduction through the base, to the thermostatic safety switch 11 which cuts the electrical supply of the electric heating resistance 3 when said temperature is about 100° C.

This cut off prevents any ignition of the grease from the foodstuff to be grilled as well as damage to the cooking apparatus and of the working surface on which the apparatus rests.

In the other embodiment in which the vessel 2 is removable, the cooking apparatus comprises preferably a detector 12 for the presence of the vessel 2 which operates as a switch mounted in series in the supply circuit of the electrical heating resistance 3 and is as shown in FIG. 2. Thus, when the vessel does not rest on the base 1 of the cooking apparatus, the electrical heating resistance is not supplied and the cooking apparatus therefore cannot cause any abnormal condition giving rise to damage to the apparatus and of the external elements of said apparatus.

What is claimed is:

1. In an electric cooking apparatus comprising a base (1) in the form of a frame defining a hollow internal region (6), a vessel (2) adapted to rest on said base in said internal region, an electric heating resistance (3) disposed above the vessel, a cooking grill (4) disposed above the resistance (3) and adapted to receive food to be grilled, and thermal regulation means (10) mounted in series with the electric heating resistance (3) and operating in a predetermined switching temperature range; the improvement comprising a thermostatic safety switch (11) disposed in the base and mounted in series with the heating resistance (3) and operating at a fixed switching temperature below a minimum temperature of said range and permitting detecting, by thermal conduction, increases of the temperature of the vessel (2) and to cut off as needed the electrical supply of the electric heating resistance (3).

2. Electric heating cooking apparatus according to claim 1, wherein the thermostatic safety switch (11) is arranged outside the internal hollow region (6) on external surface (8) of said base (1).

3. Electric cooking apparatus according to claim 1, wherein the vessel (2) comprises on opposite sides of its length two horizontal edges (5) resting on two shoulders (7) provided on two lateral opposite edges (15) of the base (1), the thermostatic safety switch (11) being disposed on the base (1) adjacent one of the edges (5) of the vessel (2) to create a small thermal path between the vessel (2) and said thermostatic safety switch (11).

4. Electric cooking apparatus according to claim 1, wherein the vessel (2) is removable and the cooking apparatus comprises also a detector (12) for detecting the presence of the vessel (2), said detector operating as a switch mounted in series with the heating resistance (3).

5. Electric cooking apparatus according to claim 1, wherein the thermostatic safety switch (11) has a range of switching temperatures varying substantially between 100° C. and 120° C.

6. Electric cooking apparatus according to claim 1, wherein the vessel (2) is of metal and the base (1) is of a plastic material and comprises on its two lateral opposite edges (15), two handles (16) each formed by a hollow body (17), one of said handles (16) enclosing the thermostatic safety switch (11).

\* \* \* \* \*